United States Patent [19]
Arold et al.

[11] Patent Number: 6,019,288
[45] Date of Patent: Feb. 1, 2000

[54] HEATING OR AIR CONDITIONING UNIT

[75] Inventors: Klaus Arold, Sindelfingen; Dieter Heinle, Pluederhausen; Markus Schoellhorn, Sindelfingen; Manfred Weindorf, Vaihingen, all of Germany

[73] Assignee: DaimlerChrysler AG, Stuttgart, Germany

[21] Appl. No.: 09/028,052

[22] Filed: Feb. 23, 1998

[30] Foreign Application Priority Data

Feb. 21, 1997 [DE] Germany .............................. 197 06 948

[51] Int. Cl.[7] ...................................................... F25B 29/00
[52] U.S. Cl. .............................. 236/13; 62/244; 165/204; 165/43; 454/152
[58] Field of Search ........................ 62/244, 186; 236/13, 236/49.3; 165/203, 204, 205, 202, 42, 43; 454/69, 75, 139, 143, 145, 152

[56] References Cited

U.S. PATENT DOCUMENTS

| | | | |
|---|---|---|---|
| 4,460,036 | 7/1984 | Yoshimi et al. ........................ | 62/244 X |
| 4,762,169 | 8/1988 | Andersen et al. ................... | 165/204 X |
| 4,898,325 | 2/1990 | Sakurada .............................. | 454/145 X |
| 5,337,802 | 8/1994 | Kajino et al. .......................... | 165/203 |

FOREIGN PATENT DOCUMENTS 36 10 188  1/1987  Germany .

*Primary Examiner*—Harry B. Tanner
*Attorney, Agent, or Firm*—Evenson, McKeown, Edwards & Lenahan, PLLC

[57] ABSTRACT

A heating or air conditioning unit for the interior of vehicles with air outlets, which are disposed in the center plane of the interior of the vehicle, particularly in the dashboard and which include at least one centrally disposed center vent and two side vents, and with a control unit with adjusting elements for influencing the air emerging from the air outlets is provided. For the purpose of adjusting the division of air between the at least one center vent and the two side vents in the driver's side and the front seat passenger's side of the interior of the vehicle from the driver's seat, two air ducts, each leading to one of the side vents, branch off from the air duct leading to the at least one center vent and, at each branching site, an air splitter is disposed, which is controlled from an air distribution adjusting element, which is disposed in a control panel of the control unit, which is usually placed centrally in the dashboard in the interior of the vehicle.

20 Claims, 3 Drawing Sheets

HEATING OR AIR CONDITIONING UNIT

BACKGROUND AND SUMMARY OF THE INVENTION

This application claims the priority of German Application No. 19706 948.7, the disclosure of which is expressly incorporated by reference herein.

The invention relates to a heating or air conditioning unit for the interior of vehicles and, more particularly, to a heating or air conditioning unit for the interior of vehicles with air outlets, which are disposed in the center plane of the interior of the vehicle, particularly in the dashboard, and which include at least one centrally disposed center vent and two side vents disposed at the side. The vents are connected over air ducts with an air distributor. A control unit has adjusting elements for influencing the air emerging from the air outlets. The adjusting elements, together with the discharging opening of the center vent, are combined into a control panel.

In the case of a known heating or air conditioning unit of the above-mentioned type, such as from German Patent document DE 36 10 188 C2, two adjacent discharging openings of two center vents (center vent left, center vent right) for the driver's side and for the front seat passenger's side of the interior are disposed in the control panel of the control unit integrated in the dashboard. For adjusting the direction of flow of the air emerging from the vents, each of the center vents is covered by a grill of pivotable air-guiding lamellas. Between the two center vents, an adjusting element of the control unit, constructed as an control wheel, is placed, the adjustment of which, over a mechanical, pneumatic, hydraulic, electric and/or electromotive remote control, opens a so-called mixing flap in the air distributor, in order to control the temperature of the air emerging from the air distributor by proportionately opening a cold air and a warm air flap at the inlet of the air distributor. To the right and left of the two center vents, a further adjusting element, which is also constructed as a control wheel and with which the amount of air, supplied over the center vents and the two side vents of the center plane, which are also disposed in the dashboard, can be regulated separately from the driver's side and from the front seat passenger's side, is disposed in the control panel. In this known connection, the amount of air, flowing into the driver's side and into the front seat passenger's side in the center plane of the interior of the vehicle is always divided in a fixed, invariable ratio between the center vent and the side vent.

It is known that a covering flap may be assigned to every vent for distributing the air to the side and center vents in the center plane of the interior of a vehicle. The covering flaps can be swiveled mechanically over a separate adjusting wheel disposed directly on each vent, in order to cover or uncover the outlet cross section of the vent more or less in this manner. With that, however, only the driver or the front seat passenger can adjust the side vent disposed on his side.

It is an object of the invention to improve a heating or air conditioning unit of the above-mentioned type for vehicle interiors so that the air can be divided conveniently from the driver's seat between the center vent and the side vent on the driver's side and on the front seat passenger's side of the interior of the vehicle.

The present invention accomplishes this objective by providing a heating or air conditioning unit for the interior of vehicles with air outlets, which are disposed in the center plane of the interior of the vehicle, particularly in the dashboard, and which include at least one centrally disposed center vent and two side vents disposed at the side. The vents are connected over air ducts with an air distributor. A control unit has adjusting elements for influencing the air emerging from the air outlets. The adjusting elements, together with the discharging opening of the center vent, are combined into a control panel. The air ducts leading to the side vents are branched off from the air duct leading to the at least one center vent. An air splitter for dividing the air flow passing through the center duct between the at least one center vent and the two side vents is disposed at each branching site. The control unit has two air distribution adjusting elements which are disposed on the control panel laterally from the center vent and each of which controls a respective air splitter.

The inventive heating and air conditioning unit has the advantage that the distribution of air between the center vent and the side vent can be adjusted on the driver's side as well as on the front seat passenger's side by use of the adjusting elements present on the control unit located on the control panel, which is disposed within the reach of the driver. The covering flaps, present on the center and side vents, as well as the control organs for actuating the cover flaps, which are assigned to the vents, are omitted. The adjusting elements of the control unit in the control panel can be constructed as knurled adjusting wheels, rocker push-buttons, adjusting knobs or the like.

Advantageous embodiments of the inventive heating and air conditioning unit with appropriate further developments and refinements of the invention are described herein.

Pursuant to a preferred embodiment of the invention, each air splitter has a pivotable air flap, which is disposed at the branching site of the side duct in such a manner that, in its one pivoting position, it completely covers the outlet opening to the side duct and completely unblocks the clear cross section of the center duct. In its other position, the pivotal air flap completely unblocks the inlet opening to the side duct and closes off the clear cross section of the center duct. The air flaps are actuated by mechanical, pneumatic, hydraulic, electric and/or electromotive remote control by the air distribution adjusting elements of the control panel of the control unit.

In an alternative embodiment of the invention, each air splitter has a first air flap, which controls the inlet opening to the side duct, and a second air flap, which controls the clear cross section of the center duct and which, as seen in the air flow direction, is disposed after the first air flap. The air flaps once again are actuated by remote control from the air distribution adjusting elements. Due to this structural design, there is greater spatial design freedom for constructing and arranging the branching sites of the side ducts. However, a coupling mechanism for the air flaps of an air splitter or a separate servomotor for each air flap of an air splitter must be provided, the two servomotors being triggered simultaneously over the air distribution adjusting element assigned to the air splitter.

Pursuant to an advantageous embodiment of the invention, a temperature-adjusting element and at least one element for adjusting the amount of air are provided in the control panel of the control unit. The adjusting elements specify to an electronic control system the nominal values for the amount and the temperature of the air flowing out of the center and side vents. By means of stored characteristic curves for linking the amount and the temperature of the air in accordance with the specified nominal values, the electronic control system adjusts the at least one warm air flap and the at least one cold air flap of a mixing chamber integrated in the air distributor. In this way, the driver can adjust from the control unit the division of air between the center vent and the side vent as well as the temperature of the air emerging there in each case.

In accordance with a preferred embodiment of the invention for ventilating the driver's side and the front seat passenger's side of the interior of the vehicle separately, two center vents, disposed next to one another, are provided in the control panel and are connected with the air distributor over air ducts, which are separate from one another. A side duct for a side vent on the driver's side and on the front seat passenger's side branches off from each center duct. The mixing chamber, integrated in air distributors, is also divided into two partial chambers, from which, in each case, one center duct branches off. A separate warm air flap and cold air flap is assigned to each partial chamber. The two cold air flaps are controlled preferably synchronously with the one temperature adjusting element disposed in the control panel.

Other objects, advantages and novel features of the present invention will become apparent from the following detailed description of the invention when considered in conjunction with the accompanying drawings.

DETAILED DESCRIPTION OF THE DRAWINGS

Figure 1:
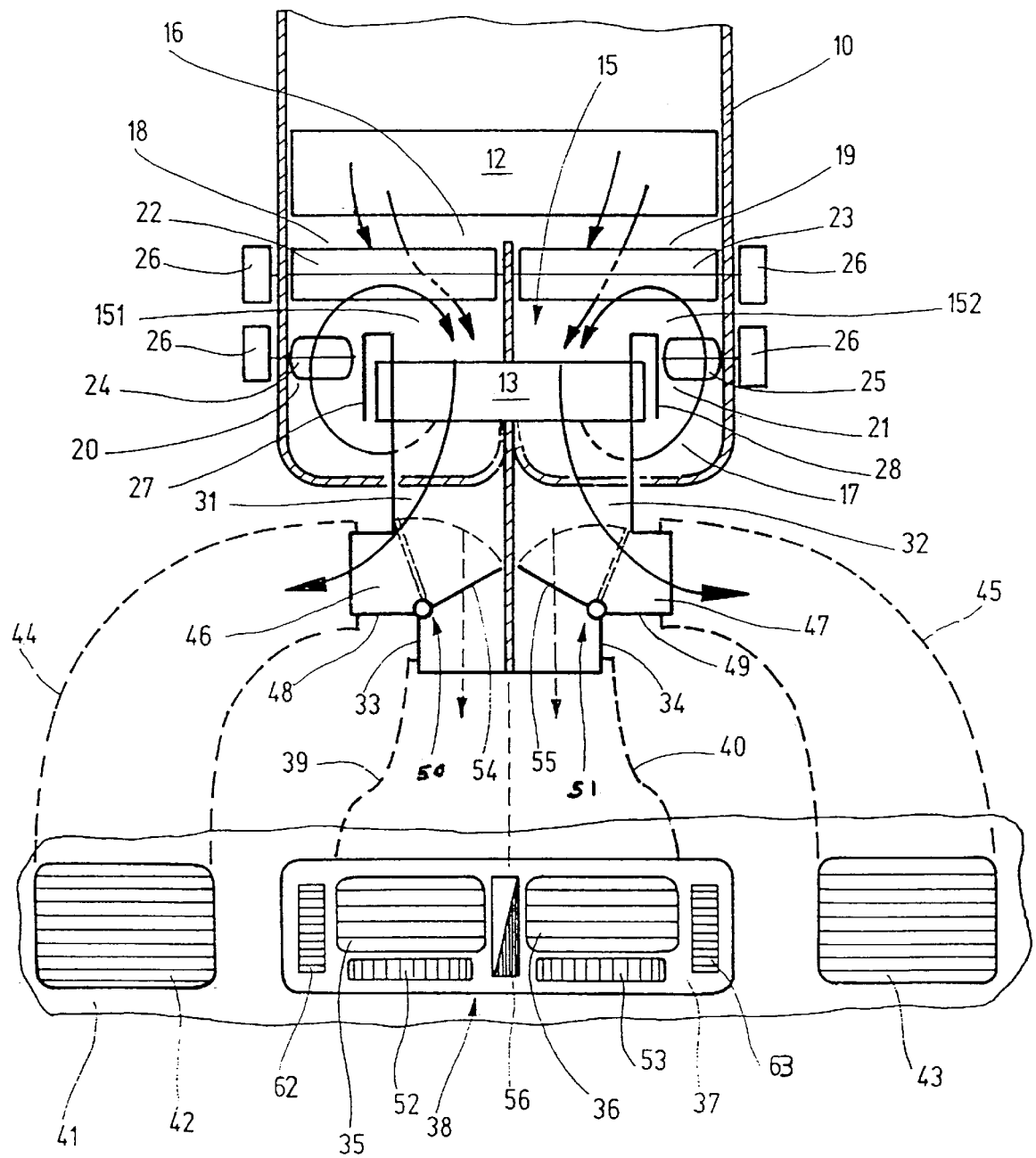
FIG. 1 is a diagram detailing a heating and air conditioning unit for supplying air separately to the driver's side and to the front seat passenger's side of the interior of a vehicle in plan view, and partially in a section view.
Figure 2:
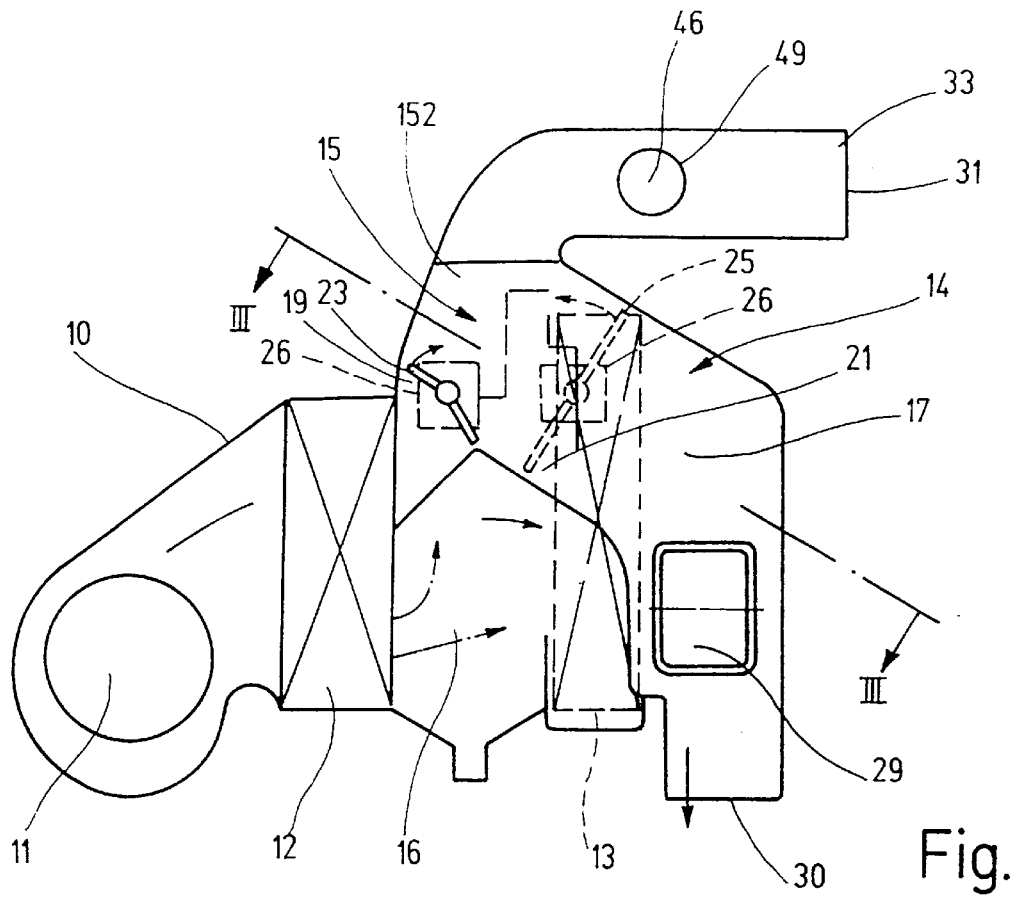
FIG. 2 is a side view of the air conditioning unit of FIG. 1, partially in section.
Figure 3:
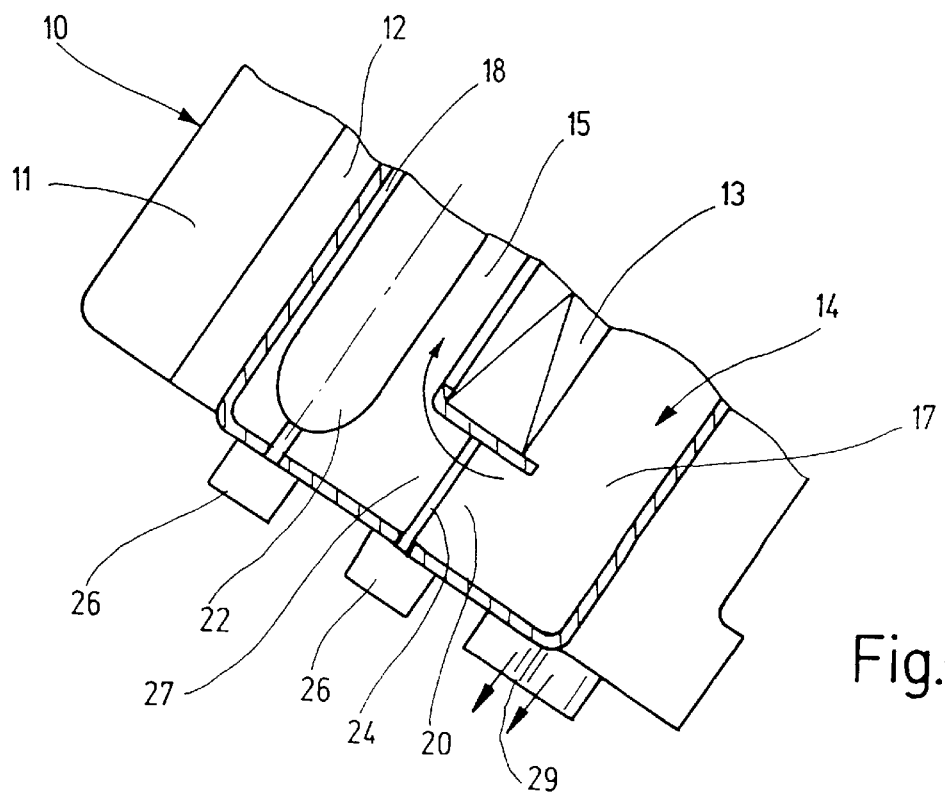
FIG. 3 is a section view taken along the line III—III of FIG. 2.

The air conditioning unit, which can be seen partially in section and as a detailed plan view in FIG. 1, and in a diagrammatic side view representation in the installed condition in FIG. 2, has a blower 11, an evaporator 12 and a heat exchanger 13, which are disposed downstream from the air flow from the fan in the above given sequence in an air conditioner housing 10. An air distributor 14 with integrated mixing chamber 15 is formed in the air conditioner housing 10 and is divided by the heat exchanger 13, extending over the whole of the clear cross section of the air conditioner housing 10, into a front space section 16, facing the evaporator 12, and a rear space section 17, lying behind the heat exchanger 13 as seen from the evaporator 12. In the upper region of the air distributor 14, the mixing chamber 15, which is divided into two partial chambers 15₁, 15₂, is disposed and connected with the front space section 16 over two cold air openings 18, 19, lying next to one another transversely to the direction of air flow, and with the rear space section 17 over two warm air openings 20, 21. In each case, one cold air opening and one warm air opening 18 and 20 or 19 and 21 discharge into a partial chamber 15₁ or 15₂ of the mixing chamber 15. Each cold air opening 18, 19 is controlled via a cold air flap 22 or 23 and each warm air opening 20, 21 is controlled via a warm air flap 24, 25. Each of the air flaps 22 to 25 is driven by a servomotor 26. The warm air openings 20, 21 are formed in each case in one of two bypass ducts 27, 28 bypassing the heat exchanger 13. The bypass ducts 27, 28 start out from the rear space section 17, pass by the side of the heat exchanger 13 and discharge in each case into one partial chamber 15₁, 15₂ of the mixing chamber 15. In each bypass duct 27 or 28, one air outlet opening 29 is provided for a rear vent and one air outlet opening 30 is provided for a leg area vent, one rear vent and one leg area vent being disposed on the driver's side and one on the front seat passenger's side of the interior of the vehicle.

Two air ducts 31, 32 (and, moreover, an air duct 31, 32 from a partial chamber 15₁, 15₂) branch off from the upper side of the mixing chamber 15 and discharge into a connecting branch 33 or 34 for each center vent 35 or 36. The two center vents 35, 36 are disposed next to one another with their vent openings, covered by a grill or lamella system, located in the control panel 37 of a control unit 38 for the air conditioning unit. Each of the center vents 35, 36 are connected over a connecting line 39 or 40 with the connecting branches 33, 34. The control panel 37 is integrated in a known manner centrally in the dashboard 41 of the interior of the vehicle.

The discharging openings of two side vents 42 and 43, which are connected to two connecting lines 44, 45 leading to the air conditioner housing 10, are also located in the dashboard 41 and, moreover, in each case, close to the left and right vehicle windshield. An air duct 46 or 47, which is surrounded by a connecting branch 48 or 49, branches off from each air duct 31, 32. The connecting line 44, leading to the side vent 42 on the driver's side, is mounted on the connecting branch 48 and the connecting line 45, leading to the side vent 43 on the front seat passenger's side, is mounted on the connecting branch 49. An air splitter 50 or 51, by means of which the air, flowing from the mixing chamber 15 into the two air ducts 31, 32, can be divided between the center vent 35 and the side vents 42 on the driver's side and between the center vent 36 and the side vents 43 of the front seat passenger's side, is disposed at each branching site. The air splitters 50, 51 are adjusted by air distribution adjusting elements 52, 53, which are disposed in the form of an adjusting wheel in the control panel 37 of the control unit 38 on the left and on the right in each case below the two center vents 35, 36, so that it is possible to adjust from the driver's seat the distribution of air between the center and side vents 35 and 42 on the driver's side or the vents 36 or 43 on the front seat passenger's side.

In the example of FIG. 1, each air splitter 50, 51 is formed as an air flap 54 or 55, which is pivotably disposed at the branching site so that, in its one pivoting end position, it closes off the air duct 46 or 47 completely and opens up the air duct 31 or 32 completely and, in its other pivoting end position, conversely closes off the air duct 31 or 32 completely and opens up the air duct 46 or 47 fully. In the intermediate positions of the air flap 54 or 55, the air, coming from the mixing chamber 15, can be divided between the center vents 35 or 36 and the side vents 42 or 43.

Furthermore, a temperature adjusting element 56 in the form of an adjusting wheel lying between the two center vents 35, 36, is disposed in the control panel 37 of the control unit 38. This adjusting wheel acts over a remote control synchronously on the two cold air flaps 22, 23. For this purpose, the remote actuation can be mechanical, pneumatic, hydraulic, electric or electronic. The two cold air flaps 22, 23 are more or less open, depending on the setting of the adjusting element 56, so that more or less cold air is supplied to the mixing chamber 15 and, with that, the temperature of the mixed air, emerging from the mixing chamber 15, can be reduced more or less.

Furthermore, two additional elements 62 and 63 for adjusting the amount of air are provided in the control panel 37 and are disposed in the form of adjusting wheels on the left and on the right, each next to a center vent 35 or 36. The elements 62, 63 for adjusting the amounts of air specify nominal values for a desired amount of air, which is to be supplied overall in the center plane of the interior of the vehicle separately for the driver's side and for the front seat passenger's side of the center and side nozzles. A nominal value for the temperature of this desired amount of air is specified by the temperature adjusting element 56. These nominal values are supplied to the controlling electronic system, which is not shown here and in which characteristic curves for linking the amount and temperature of the air are stored. On the basis of the specified nominal values, the controlling electronic system obtains the corresponding manipulated variables from the characteristic curves and, with these, controls the manipulated variables of the servo motors 26 for the cold air and warm air flaps 22 to 25 in the two partial chambers 151, 152 of the mixing chamber 15. In this way, it is also possible to adjust the temperature and amount of air supplied to the center plane of the vehicle interior. The proportion of temperature-controlled, specified amount of air flowing out through the center vents 35, 36 and that flowing out through the side vents 42, 43 is determined, as in the past, by the setting of the air distribution adjusting elements 52 and 53 for the driver's side and for the front seat passenger's side, which are disposed below the center vents 35, 36 on the control panel 37.

Figure 4:
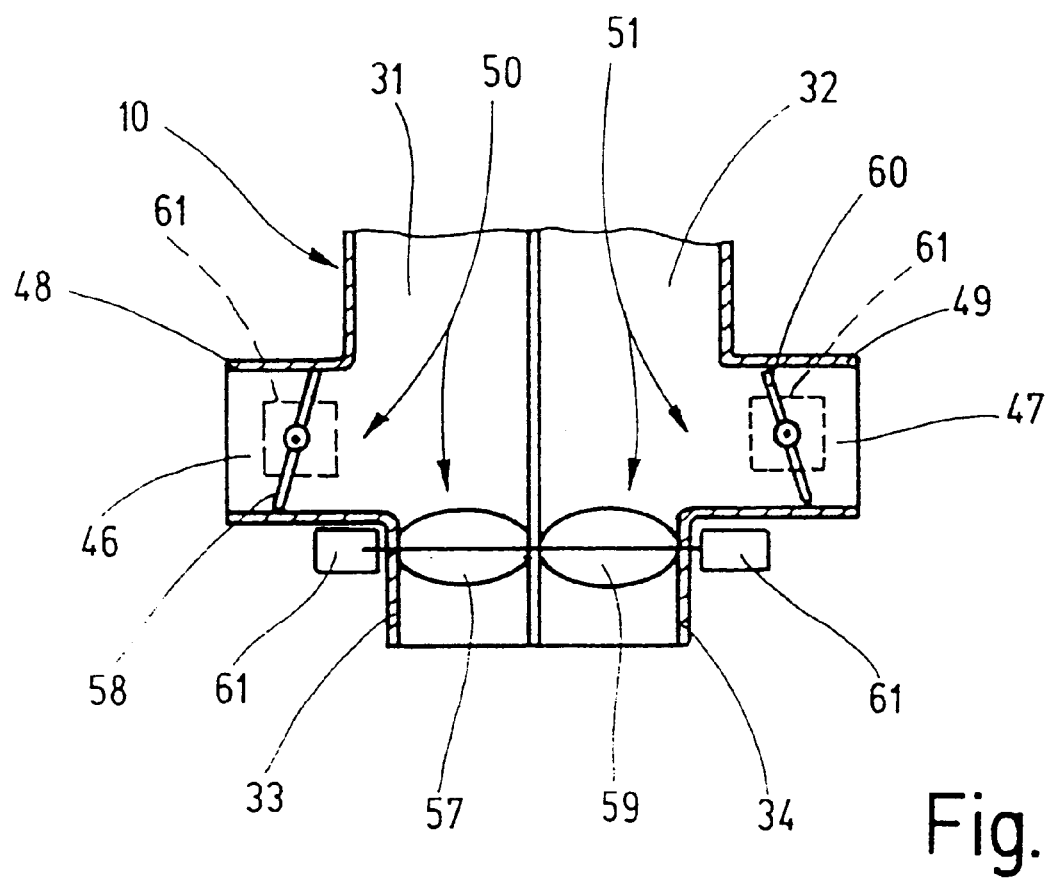
FIG. 4 is a diagram detailing a modified air conditioning unit, in a representation similar to that of FIG. 1.

In the air conditioning unit, a detail of which is shown diagrammatically in FIG. 4, only the construction of the two air splitters 50, 51 in the branching sites of the air ducts 46, 47 to the side vents 42, 43 is modified from the air ducts 31, 32 to the center vents 35, 36. The components, identical to those in FIG. 1, have the same reference numbers. Each air splitter 50, 51 consists of two separate, pivotably disposed air flaps 57 and 58 or 59 and 60. The air flaps 58 and 60 are assigned to the air ducts 46 and 47 leading to the side vents 42, 43 and the air flaps 57, 59 control the air passage cross section of the air ducts 31, 32 leading to the center vents 35, 36 which, as seen in the air flow direction, are behind the branching sites. Each air flap 57 to 60 is actuated by a servomotor 61. The servomotors 61 are controlled by a controlling electronic system as a function of the setting of the air distribution adjusting elements 52, 53 of the control unit 38.

The invention is not limited to the examples described. The division of the mixing chamber 15 into two separate partial chambers 151, 152 can be omitted and only a single cold air opening, controlled by a cold air flap, may be provided for the mixing chamber 15. In this case, the temperature of the air, emerging on the driver's side and on the front seat passenger's side, can only be set at the same value.

Furthermore, it is possible to provide only a single center vent in the control panel 18. In this case, a single air duct branches off from the mixing chamber 15, which is not divided, to the center vent and the two air ducts 46, 47, leading to the side vents 42, 43, branch off from the single air duct leading to the center vent.

By omitting the evaporator 12, the air conditioning unit becomes strictly a heating unit. The adjusting wheels 52, 53 and 62, 63, as well as 56, can also be replaced by control knobs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heating or air conditioning unit for an interior of a vehicle having air outlets, which are disposed in a center plane of the interior and which include at least one centrally disposed center vent and two side vents disposed at the side which are connected over air ducts with an air distributor, and which further includes a control unit which has adjusting elements for influencing air emerging from the air outlets, said adjusting elements, together with a discharging opening of the center vent being combined into a control panel, wherein said air ducts leading to the side vents are branched off from the air duct leading to the at least one center vent, and further wherein an air splitter for dividing the air flow, passing through the center duct between the at least one center vent and the two side vents is disposed at each branching site, and wherein the control unit has two air distribution adjusting elements which are disposed on the control panel, accessible by a driver, near the center vent, each of which directly controls a respective air splitter;

whereby the driver can effect air flow distribution between a respective side vent and the at least one center vent on both sides of the vehicle.

2. The heating or air conditioning unit according to claim 1, wherein a mixing chamber, to which cold air can be supplied in measured amounts over at least one controllable cold air flap and warm air in measured amounts over at least one controllable warm air flap is formed upstream from the at least one center duct, and wherein the control unit has a temperature adjusting element which influences the pivoted position at least of the cold air flap by remote control.

3. The heating or air conditioning unit according to claim 2, wherein each air splitter has a pivotable air flap which is disposed at the branching site in such a manner that, in its one pivoting end position, it covers the inlet opening to the side duct completely and opens up the clear cross section of the center duct fully and, in its other pivoting end position, opens up the inlet opening to the side duct completely and closes off the clear cross section of the center duct, and wherein the air quantity adjusting element assigned to the air splitter actuates the air flap by remote control into the two pivoting end positions and into any intermediate pivoting position.

4. The heating or air conditioning unit according to claim 2, wherein each air splitter has an air flap which controls the inlet opening to the side duct, and a second air flap which controls the clear cross section of the center duct and is disposed, as seen in an air flow direction, behind the first air flap, and wherein the air distribution adjusting element assigned to the air splitter controls both air flaps by remote control.

5. The heating or air conditioning unit according to claim 2, wherein at least one air quantity adjusting element is provided in the control unit, in that, with said air quantity adjusting element and the temperature adjusting element, nominal values for the amount and temperature of the air are specified to a controlling electronic system, which adjusts the at least one cold air and warm air flap using stored characteristic curves for linking the amount of air to the temperature of the air.

6. The heating or air conditioning unit according to claim 5, wherein for ventilating a driver's side and a front seat passenger's side of the interior of the vehicle separately, two discharging openings of two center vents are provided in the control panel and connected over mutually separate air ducts with the air distributor, and wherein the side duct for the side vent of the driver's side branches off from the center duct for the center vent of the driver's side and the side duct for the side vent of the front seat passenger's side branches off from the center duct for the center vent of the driver's side.

7. The heating or air conditioning unit according to claim 5, wherein the controlling electronic system has a nominal value input for each air quantity adjusting element and a nominal value input for the temperature adjusting element, as well as a control output for each of the servomotors for cold air and warm air flaps.

8. The heating or air conditioning unit according to claim 2, wherein for ventilating a driver's side and a front seat passenger's side of the interior of the vehicle separately, two discharging openings of two center vents are provided in the control panel and connected over mutually separate air ducts with the air distributor, and wherein the side duct for the side vent of the driver's side branches off from the center duct for the center vent of the driver's side and the side duct for the side vent of the front seat passenger's side branches off from the center duct for the center vent of the driver's side.

9. The heating or air conditioning unit according to claim 2, wherein the temperature adjusting element controls the two cold air flaps synchronously.

10. The heating or air conditioning unit according to claim 1, wherein each air splitter has a pivotable air flap which is disposed at the branching site in such a manner that, in its one pivoting end position, it covers the inlet opening to the side duct completely and opens up the clear cross section of the center duct fully and, in its other pivoting end position, opens up the inlet opening to the side duct completely and closes off the clear cross section of the center duct, and wherein the air quantity adjusting element assigned to the air splitter actuates the air flap by remote control into the two pivoting end positions and into any intermediate pivoting position.

11. The heating or air conditioning unit according to claim 10, wherein at least one air quantity adjusting element is provided in the control unit, in that, with said air quantity adjusting element and the temperature adjusting element, nominal values for the amount and temperature of the air are specified to a controlling electronic system, which adjusts the at least one cold air and warm air flap using stored characteristic curves for linking the amount of air to the temperature of the air.

12. The heating or air conditioning unit according to claim 10, wherein for ventilating a driver's side and a front seat passenger's side of the interior of the vehicle separately, two discharging openings of two center vents are provided in the control panel and connected over mutually separate air ducts with the air distributor, and wherein the side duct for the side vent of the driver's side branches off from the center duct for the center vent of the driver's side and the side duct for the side vent of the front seat passenger's side branches off from the center duct for the center vent of the driver's side.

13. The heating or air conditioning unit according to claim 1, wherein each air splitter has an air flap which controls the inlet opening to the side duct, and a second air flap which controls the clear cross section of the center duct and is disposed, as seen in an air flow direction, behind the first air flap, and wherein the air distribution adjusting element assigned to the air splitter controls both air flaps by remote control.

14. The heating or air conditioning unit according to claim 13, wherein at least one air quantity adjusting element is provided in the control unit, in that, with said air quantity adjusting element and the temperature adjusting element, nominal values for the amount and temperature of the air are specified to a controlling electronic system, which adjusts the at least one cold air and warm air flap using stored characteristic curves for linking the amount of air to the temperature of the air.

15. The heating or air conditioning unit according to claim 13, wherein for ventilating a driver's side and a front seat passenger's side of the interior of the vehicle separately, two discharging openings of two center vents are provided in the control panel and connected over mutually separate air ducts with the air distributor, and wherein the side duct for the side vent of the driver's side branches off from the center duct for the center vent of the driver's side and the side duct for the side vent of the front seat passenger's side branches off from the center duct for the center vent of the driver's side.

16. The heating or air conditioning unit according to claim 1, wherein for ventilating a driver's side and a front seat passenger's side of the interior of the vehicle separately, two discharging openings of two center vents are provided in the control panel and connected over mutually separate air ducts with the air distributor, and wherein the side duct for the side vent of the driver's side branches off from the center duct for the center vent of the driver's side and the side duct for the side vent of the front seat passenger's side branches off from the center duct for the center vent of the driver's side.

17. The heating or air conditioning unit according to claim 16, wherein the mixing chamber is divided into two partial chambers, from each of which a center duct branches off, and wherein a separate cold air and warm air flap is assigned to each partial chamber of the mixing chamber.

18. The heating or air conditioning unit according to claim 17, wherein the temperature adjusting element controls the two cold air flaps synchronously.

19. The heating or air conditioning unit according to claim 17, wherein the controlling electronic system has a nominal value input for each air quantity adjusting element and a nominal value input for the temperature adjusting element, as well as a control output for each of the servomotors for cold air and warm air flaps.

20. A heating unit for an interior of a vehicle, comprising:
at least one center vent disposed in a center plane of the interior;
at least two side vents disposed in the interior of the vehicle;
a center air duct which leads to said at least one center vent;
side air ducts leading to said two side vents, said side air ducts branching off from said center air duct at branch sites;
an air splitter disposed at each of said branch sites, said air splitter dividing an air flow passing through the center air duct between said at least one center vent and an associated one of said two side vents; and
a control unit having two air distribution adjusting elements disposed on a control panel accessible by a driver of the vehicle, each of which directly controls an associated air splitter;
whereby the driver can effect air flow distribution between a respective side vent and the at least one center vent on both sides of the vehicle.

* * * * *